US012046134B2

(12) United States Patent
Wolfe

(10) Patent No.: US 12,046,134 B2
(45) Date of Patent: Jul. 23, 2024

(54) SYSTEM AND METHOD FOR IDENTIFYING A VEHICLE SUBJECT TO AN EMERGENCY ALERT AND DISPATCHING OF SIGNALS

(71) Applicant: Kodiak Robotics, Inc., Mountain View, CA (US)

(72) Inventor: Thomas S. Wolfe, Vestavia Hills, AL (US)

(73) Assignee: Kodiak Robotics, Inc., Mountain View, CA (US)

( * ) Notice: Subject to any disclaimer, the term of this patent is extended or adjusted under 35 U.S.C. 154(b) by 0 days.

(21) Appl. No.: 17/810,160

(22) Filed: Jun. 30, 2022

(65) Prior Publication Data

US 2024/0005786 A1 Jan. 4, 2024

(51) Int. Cl.
*G08G 1/017* (2006.01)
*G08G 1/01* (2006.01)

(52) U.S. Cl.
CPC ......... *G08G 1/0175* (2013.01); *G08G 1/0137* (2013.01)

(58) Field of Classification Search
CPC ........................... G08G 1/0175; G08G 1/0137
See application file for complete search history.

(56) References Cited

U.S. PATENT DOCUMENTS 9,142,127 B1 * 9/2015 McDevitt-Pimbley ..................... G08G 1/052
11,037,443 B1 * 6/2021 Cui .................. G08G 1/096741
2004/0101166 A1 * 5/2004 Williams .................. G01P 3/38 348/148
2010/0253541 A1 * 10/2010 Seder ................... G08G 1/0962 340/905
2015/0061895 A1 3/2015 Ricci
2016/0078759 A1 * 3/2016 Nerayoff ................ G08G 1/133 701/3
2018/0268238 A1 * 9/2018 Khan ................... G06V 10/751
2019/0051142 A1 * 2/2019 Wiles ...................... H04W 4/06
2019/0347809 A1 11/2019 Sato
2020/0151360 A1 * 5/2020 Zavesky ............. G06F 21/6218
2020/0151611 A1 5/2020 McGavran et al.
2020/0202706 A1 6/2020 Chaves et al.
2021/0035442 A1 * 2/2021 Baig .................... G08G 1/0112
2021/0223783 A1 * 7/2021 M ........................ G05D 1/0221
2023/0303122 A1 * 9/2023 Geyer ............... B60W 60/0017 701/23

* cited by examiner

*Primary Examiner* — Chico A Foxx
(74) *Attorney, Agent, or Firm* — Fox Rothschild LLP

(57) ABSTRACT

Systems and methods are provided for identifying a vehicle subject to an emergency alert are provided. The system comprises one or more autonomous vehicles, each autonomous vehicle comprising a vehicle detection and identification system configured to analyze one or more vehicles within a surrounding environment, and a wireless emergency alert system. The wireless emergency alert system may be configured to receive or generate an emergency alert, wherein the emergency alert includes a geographic region associated with the emergency alert and one or more identifiable markers of a wanted vehicle, determine one or more autonomous vehicles to receive the emergency alert, and relay the emergency alert to the one or more autonomous vehicles.

15 Claims, 6 Drawing Sheets

400

SYSTEM AND METHOD FOR IDENTIFYING A VEHICLE SUBJECT TO AN EMERGENCY ALERT AND DISPATCHING OF SIGNALS

BACKGROUND

Field of the Disclosure

Embodiments of the present disclosure relate to vehicle detection and, in particular, to vehicle detection and identification subject to an emergency alert.

Description of the Related Art

Self-driving or otherwise autonomous vehicles require the ability to be able to detect one or more objects and/or potential hazards within the environment of the vehicle in order to safely and efficiently navigate the environment and prevent possible collision. These vehicles include detection mechanisms (e.g., cameras, radar, LiDAR, etc.) configured to enable these vehicles to perform these functions.

In addition to detecting these objects, the detection mechanisms could be programmed to detect identifiable features (e.g., license plate number, color, make, model, etc.) of one or more objects in order to not only detect the objects, but also to identify the objects based on these one or more detected identifiable features.

Identifying objects (e.g., identifying a particular vehicle) can be used to help authorities track down certain vehicles for one or more investigative purposes. For example, in the event of an emergency alert (e.g., an Amber Alert), the detection mechanisms of a self-driving or otherwise autonomous vehicle may be used to image the license plate of a vehicle in order to determine if the vehicle matches a vehicle description identifies in the emergency alert.

However, privacy concerns make reading license plates from an autonomous vehicle a contentious issue, given that drivers may feel that giving autonomous vehicles carte blanche to analyze all identifiable features for every vehicle within the environment of the autonomous vehicle is a violation of privacy.

For at least these reasons, systems and methods are needed to enable autonomous vehicles to identify vehicles in the event of an emergency alert, taking into account the urgency of emergency alerts, while increasing protections of privacy for vehicles not identified within the emergency alert.

SUMMARY

According to an aspect of the present disclosure, a system for identifying a vehicle subject to an emergency alert is provided. The system comprises one or more autonomous vehicles, each autonomous vehicle comprising a vehicle detection and identification system configured to analyze one or more vehicles within a surrounding environment, and a wireless emergency alert system. The wireless emergency alert system may be configured to receive or generate an emergency alert, wherein the emergency alert includes a geographic region associated with the emergency alert and one or more identifiable markers of a wanted vehicle, determine one or more autonomous vehicles to receive the emergency alert, and relay the emergency alert to the one or more autonomous vehicles.

According to various embodiments, the system further comprises a central dispatch, and the wireless emergency alert system is configured to relay the emergency alert to the one or more autonomous vehicles via the central dispatch.

According to various embodiments, determining the one or more autonomous vehicles to receive the emergency alert comprises determining which autonomous vehicles are located within the geographic region, and selecting one or more autonomous vehicles within the geographic region as the one or more autonomous vehicles to receive the emergency alert.

According to various embodiments, the vehicle detection and identification system comprises one or more detection mechanisms configured to capture one or more images of the surrounding environment, one or more location detection systems, and an emergency alert module configured to analyze the one or more images of the surrounding environment.

According to various embodiments, the emergency alert module comprises one or more of the following: a color detection module, configured to detect one or more colors of a detected vehicle within the one or more images; a make/model detection module, configured to detect a make or model of the detected vehicle; and a plate reader module, configured to detect a location associated with a license plate of the detected vehicle, and one or more characters of the license plate.

According to various embodiments, for each autonomous vehicle, upon receiving the emergency alert, the autonomous vehicle is configured to set a state of the emergency alert module to an on state.

According to various embodiments, the vehicle detection and identification system is configured to determine whether a vehicle within the surrounding environment matches the one or more identifiable markers of the wanted vehicle, and, when the vehicle within the surrounding environment matches the one or more identifiable markers, the vehicle detection and identification system is further configured to generate a signal indicating that the vehicle matches the wanted vehicle and that the vehicle is a positively identified vehicle.

According to various embodiments, the wireless emergency alert system is further configured to generate a command to stay active configured to set a state of the emergency alert module of any of the one or more autonomous vehicles within a geographic region of the positively identified vehicle to be in an on state, and send the command to stay active to the one or more autonomous vehicles within the geographic region of the positively identified vehicle.

According to another aspect of the present disclosure, a system for identifying a vehicle subject to an emergency alert is provided. The system comprises one or more autonomous vehicles, each autonomous vehicle comprising a vehicle detection and identification system configured to analyze one or more vehicles within a surrounding environment, a central dispatch, and a wireless emergency alert system. The wireless emergency alert system may be configured to receive or generate an emergency alert, determine one or more autonomous vehicles to receive the emergency alert, and relay the emergency alert to the one or more autonomous vehicles via the central dispatch. The emergency alert may comprise a geographic region associated with the emergency alert and one or more identifiable markers of a wanted vehicle, and the wireless emergency alert system may comprise an emergency alert module configured to analyze the one or more images of the surrounding environment.

According to various embodiments, the emergency alert is designated for a geographic region, and determining the one or more autonomous vehicles to receive the emergency alert comprises determining which autonomous vehicles are located within the geographic region, and selecting one or more autonomous vehicles within the geographic region as the one or more autonomous vehicles to receive the emergency alert.

According to various embodiments, the vehicle detection and identification system further comprises one or more detection mechanisms configured to capture one or more images of the surrounding environment, and one or more location detection systems. The emergency alert module may be further configured to analyze the one or more images of the surrounding environment.

According to various embodiments, the emergency alert module may comprise one or more of the following: a color detection module, configured to detect one or more colors of a detected vehicle within the one or more images; a make/model detection module, configured to detect a make or model of the detected vehicle; and a plate reader module, configured to detect a location associated with a license plate of the detected vehicle, and one or more characters of the license plate.

According to various embodiments, for each autonomous vehicle, upon receiving the emergency alert, the autonomous vehicle may be configured to set a state of the emergency alert module to an on state.

According to various embodiments, the vehicle detection and identification system may be configured to determine whether a vehicle within the surrounding environment matches the one or more identifiable markers of the wanted vehicle, and, when the vehicle within the surrounding environment matches the one or more identifiable markers, the vehicle detection and identification system may be further configured to generate a signal indicating that the vehicle matches the wanted vehicle and that the vehicle is a positively identified vehicle.

According to various embodiments, the wireless emergency alert system may be further configured to generate a command to stay active configured to set a state of the emergency alert module of any of the one or more autonomous vehicles within a geographic region of the positively identified vehicle to be in an on state, and send the command to stay active to the one or more autonomous vehicles within the geographic region of the positively identified vehicle.

According to another aspect of the present disclosure, a central dispatch for identifying a vehicle subject to an emergency alert is provided. The central dispatch may comprise a transceiver configured to receive a positive identification signal generated from an autonomous vehicle, the positive identification signal indicating that a wanted vehicle has been positively identified, a processor, and a memory configured to store programming instructions. The programming instructions, when executed, may cause the processor to identify a location of the autonomous vehicle, locate one or more other autonomous vehicles that are searching for the wanted vehicle, subject to an emergency alert, and send, by the transceiver, a search halt command to some or all of the one or more other autonomous vehicles searching for the wanted vehicle, the search halt command configured to cause the one or more other autonomous vehicle to cease a search for the wanted vehicle.

According to various embodiments, the transceiver may be further configured to receive velocity information regarding the wanted vehicle, and the programming instructions, when executed, may be further configured to cause the processor to determine which of the one or more other autonomous vehicles are less than a threshold distance from the autonomous vehicle that generated the positive identification signal, and based on the velocity information, send, using the transceiver, a command to stay active in the search for the wanted vehicle to the one or more other autonomous vehicles that are less than a threshold distance from the autonomous vehicle that generated the positive identification signal.

According to various embodiments, the programming instructions, when executed, may be further configured to cause the processor to send a command to stay active in the search for the wanted vehicle to the autonomous vehicle that sent the positive identification signal until the wanted vehicle is no longer within a field of vision of the autonomous vehicle that sent the positive identification signal.

DETAILED DESCRIPTION

Figure 1:
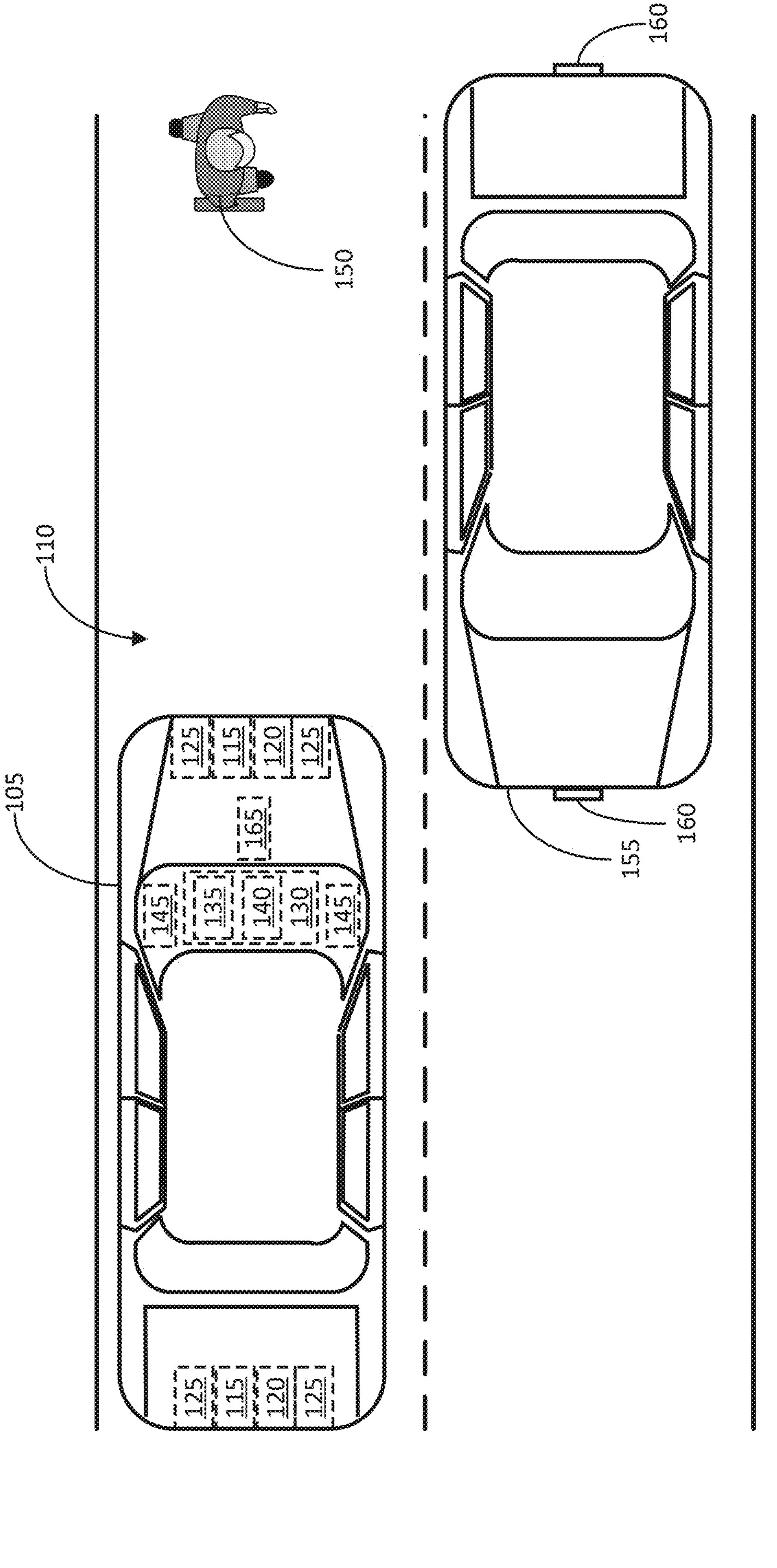
FIG. 1 illustrates an example autonomous vehicle on a roadway configured to identify a vehicle subject to an emergency alert, according to various embodiments of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

An "electronic device" or a "computing device" refers to a device that includes a processor and memory. Each device may have its own processor and/or memory, or the processor and/or memory may be shared with other devices as in a virtual machine or container arrangement. The memory bill contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "module" refers to a set of computer-readable programming instructions, as executed by a processor, that cause the processor to perform a specified function.

The term "vehicle," or other similar terms, refers to any motor vehicles, powered by any suitable power source, capable of transporting one or more passengers and/or cargo. The term "vehicle" includes, but is not limited to, autonomous vehicles (i.e., vehicles not requiring a human operator and/or requiring limited operation by a human operator), automobiles (e.g., cars, trucks, sports utility vehicles, vans, buses, commercial vehicles, etc.), boats, drones, trains, and the like.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable programming instructions executed by a processor, controller, or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network-coupled computer systems so that the computer readable media may be stored and executed in a distributed fashion such as, e.g., by a telematics server or a Controller Area Network (CAN).

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

Hereinafter, some embodiments of the present disclosure will be described in detail with reference to the drawings. In the drawings, the same reference numerals will be used throughout to designate the same or equivalent elements. In addition, a detailed description of well-known features or functions will be ruled out in order not to unnecessarily obscure the gist of the present disclosure.

Hereinafter, systems and methods for vehicle detection and identification subject to an emergency alert, according to embodiments of the present disclosure, will be described with reference to the accompanying drawings.

Referring now to FIG. 1, an autonomous vehicle 105 on a roadway 110, configured to identify a vehicle subject to an emergency alert is illustratively depicted, in accordance with various embodiments of the present disclosure.

According to various embodiments, the vehicle 105 includes one or more detection mechanisms/sensors such as, for example, one or more LiDAR sensors 115, one or more radio detection and ranging (RADAR) sensors 120, and one or more image capturing devices (e.g., cameras 125), among other suitable detection mechanisms/sensors. According to various embodiments, the one or more detection mechanisms/sensors may be in electronic communication with one or more computing devices 130. The computing devices 130 may be separate from the one or more detection mechanisms/sensors and/or may be incorporated into the one or more detection mechanisms/sensors. The vehicle 105 may include one or more transceivers 165 configured to send and/or receive one or more signals, messages, alerts, etc. According to various embodiments, the one or more transceivers 165 may be coupled to the one or more computing devices 130 and/or may be separate from the one or more computing devices 130.

In the example of FIG. 1, the one or more cameras 125 are positioned along the vehicle 105 such that the one or more cameras 125 are configured to image all or part of an environment surrounding the vehicle 105. According to various embodiments, the one or more cameras may be configured to detect one or more objects (e.g., one or more pedestrians 150, vehicles 155, etc.). The one or more cameras 125 may be configured to detect one or more identifiable features of a detected vehicle 155, such as, e.g., a make of the detected vehicle 155, a model of the detected vehicle 155, one or more colors of the detected vehicle 155, a license plate 160 of the detected vehicle 155, one or more characters of the license plate 160 of the detected vehicle 155, a location associated with the license plate 160 of the detected vehicle 155, and/or other suitable identifiable features of the detected vehicle 155.

In the example of FIG. 1, the vehicle 105 includes one or more location detection systems 145 configured to determine a geographic location and/or region at which the vehicle 105 is located. The location detection system 145 may be, e.g., a Global Positioning System (GPS) device and/or other suitable device and/or system for determining geographic location and/or region. According to various embodiments, the one or more location detection systems

145 may be coupled to the one or more computing devices 130 and/or may be separate from the one or more computing devices 130.

According to various embodiments, the computing device 130 may include a processor 135 and/or a memory 140. The memory 140 may be configured to store programming instructions that, when executed by the processor 135, may cause the processor 135 to perform one or more tasks such as, e.g.: receiving, using an emergency alert module of the autonomous vehicle 105, an emergency alert, wherein the emergency alert includes a geographic region associated with the emergency alert and one or more identifiable markers of a wanted vehicle (a vehicle subject to an emergency alert); determining, using the location detection system 145, whether the autonomous vehicle 105 is within a geographic region associated with an emergency alert; detecting, using one or more detection mechanisms (e.g., the one or more cameras 125) coupled to the autonomous vehicle 105, a detected vehicle 155 within an environment of the autonomous vehicle 105; when the autonomous vehicle 105 is within the geographic region associated with the emergency alert, determining, for each identifiable marker, whether the detected vehicle matches the identifiable marker; and, when the detected vehicle 155 matches the one or more identifiable markers, generating, using a processor coupled to the autonomous vehicle, a signal indicating that the detected vehicle 155 is the wanted vehicle. The one or more identifiable markers may include one or more of one or more license plate characters of the wanted vehicle, a location associated with a license plate of the wanted vehicle, a make of the wanted vehicle, a model of the wanted vehicle, and a color of the wanted vehicle, among other suitable identifiable features. According to various embodiments, the programming instructions may be further configured to cause the processor 135 to transmit the signal, using the transceiver 165, indicating that the detected vehicle 155 is the wanted vehicle.

According to various embodiments, the determining whether the detected vehicle 155 matches the identifiable marker may include determining a make and model of the detected vehicle 155, and determining whether the make and model of the detected vehicle 155 matches the make and model of the wanted vehicle.

According to various embodiments, the determining whether the detected vehicle 155 matches the identifiable marker includes detecting a license plate 160 of the detected vehicle 155, and determining, using a license plate reader module of the autonomous vehicle 105, a location associated with the license plate 160 of the detected vehicle 155. The location associated with the license plate 160 of the detected vehicle 155 may be, e.g., a state, county, or territory in which the detected vehicle 155 is registered/licensed.

According to various embodiments, when the location associated with the license plate 160 of the detected vehicle 155 matches a location associated with the license plate of the wanted vehicle, the determining whether the detected vehicle 155 matches the identifiable marker includes, analyzing, using the license plate reader module, the license plate 160 of the detected vehicle 155. The analyzing includes, for each character of the license plate 160 of the detected vehicle 155, determining the character of the license plate 160 of the detected vehicle 155, and determining whether the character of the license plate 160 of the detected vehicle 155 matches a respective character of the license plate of the wanted vehicle. According to various embodiments, when the character of the license plate 160 of the detected vehicle 155 matches the respective character of the license plate of the wanted vehicle, and when there is a subsequent character of the license plate 160 of the detected vehicle 155, the license plate 160 of the detected vehicle 155 is analyzed for the subsequent character. According to various embodiments, when the character of the license plate 160 of the detected vehicle 155 does not match the respective character of the license plate of the wanted vehicle, the analyzing of the license plate 160 of the detected vehicle 155 ends.

Figure 2:
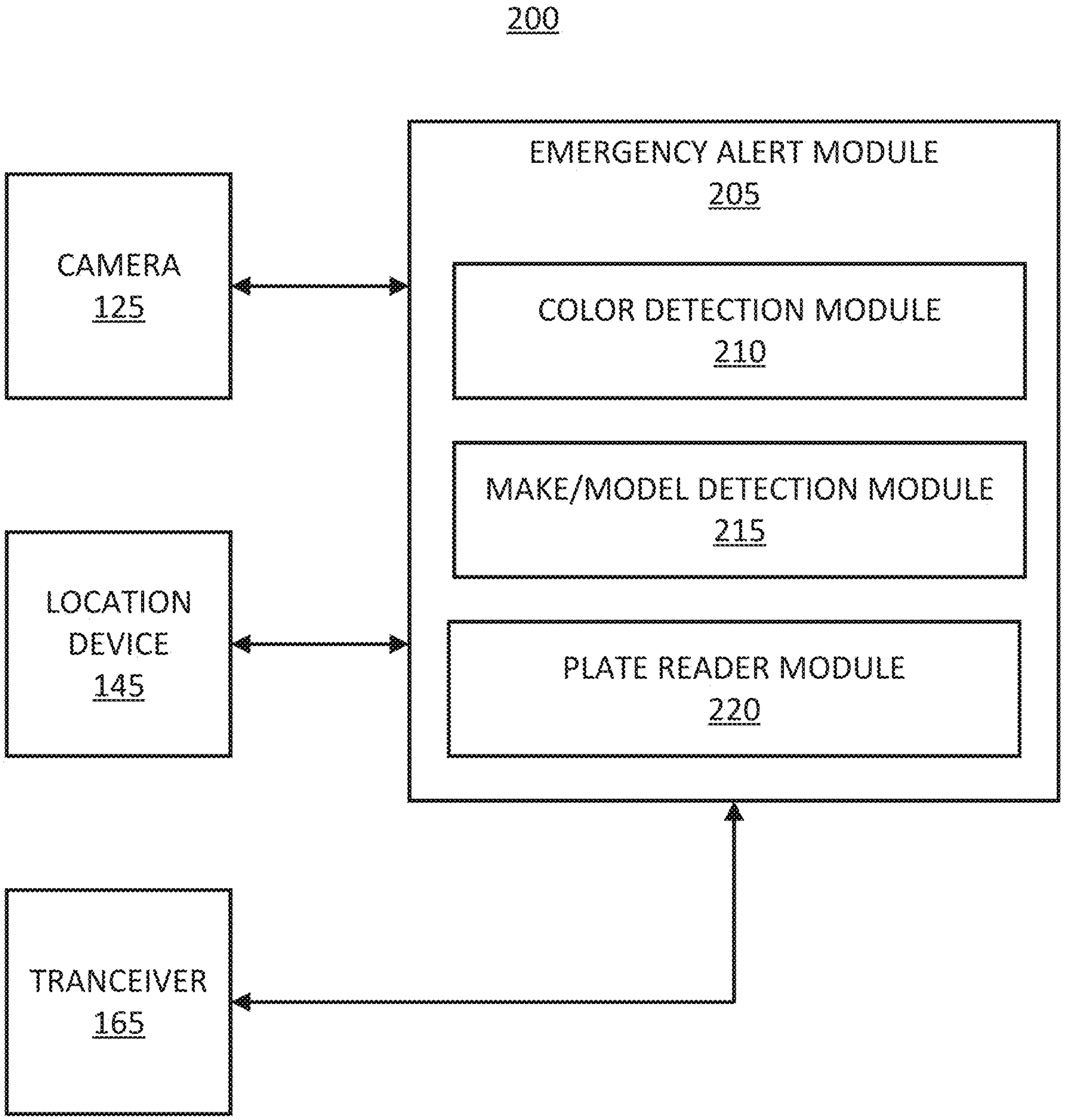
FIG. 2 is an example block diagram of an emergency alert module of a vehicle, according to various embodiments of the present disclosure.

The vehicle 105 may include a vehicle detection and identification system 200 as shown, for example, in FIG. 2. The vehicle detection and identification system 200 may be configured to aid the vehicle 105 in analyzing one or more vehicles within a surrounding environment in order to detect and/or identify one or more detected vehicles 155 within the environment of the vehicle 105 and determine whether any of the detected and/or identified vehicles conforms to a wanted vehicle.

According to various embodiments, the vehicle detection and identification system 200 may include one or more detection mechanisms (e.g., one or more cameras 125) configured to capture one or more images of the autonomous vehicle's surrounding environment, one or more location detection systems 145, and/or one or more transceivers 165. The vehicle detection and identification system 200 may include an emergency alert module 205 configured to analyze one or more images captured by the one or more cameras 125.

The emergency alert module 205 may include one or more color detection modules 210, configured to detect and/or determine one or more colors of a detected vehicle 155 based on the input from the one or more detection mechanisms, one or more make/model detection modules 215, configured to detect and/or determine the make and/or model of a detected vehicle 155 based on the input from the one or more detection mechanisms, one or more plate reader modules 220, configured to detect and/or determine a location associated with a license plate 160 of a detected vehicle 155 and/or one or more characters of the license plate 160 of a detected vehicle 155, and/or other suitable vehicle identification modules. The emergency alert module 205 may be contained within and/or in electronic communication with the one or more computing devices 130. According to various embodiments, the emergency alert module 205 is in an off state until an active emergency alert is received.

Figure 3:
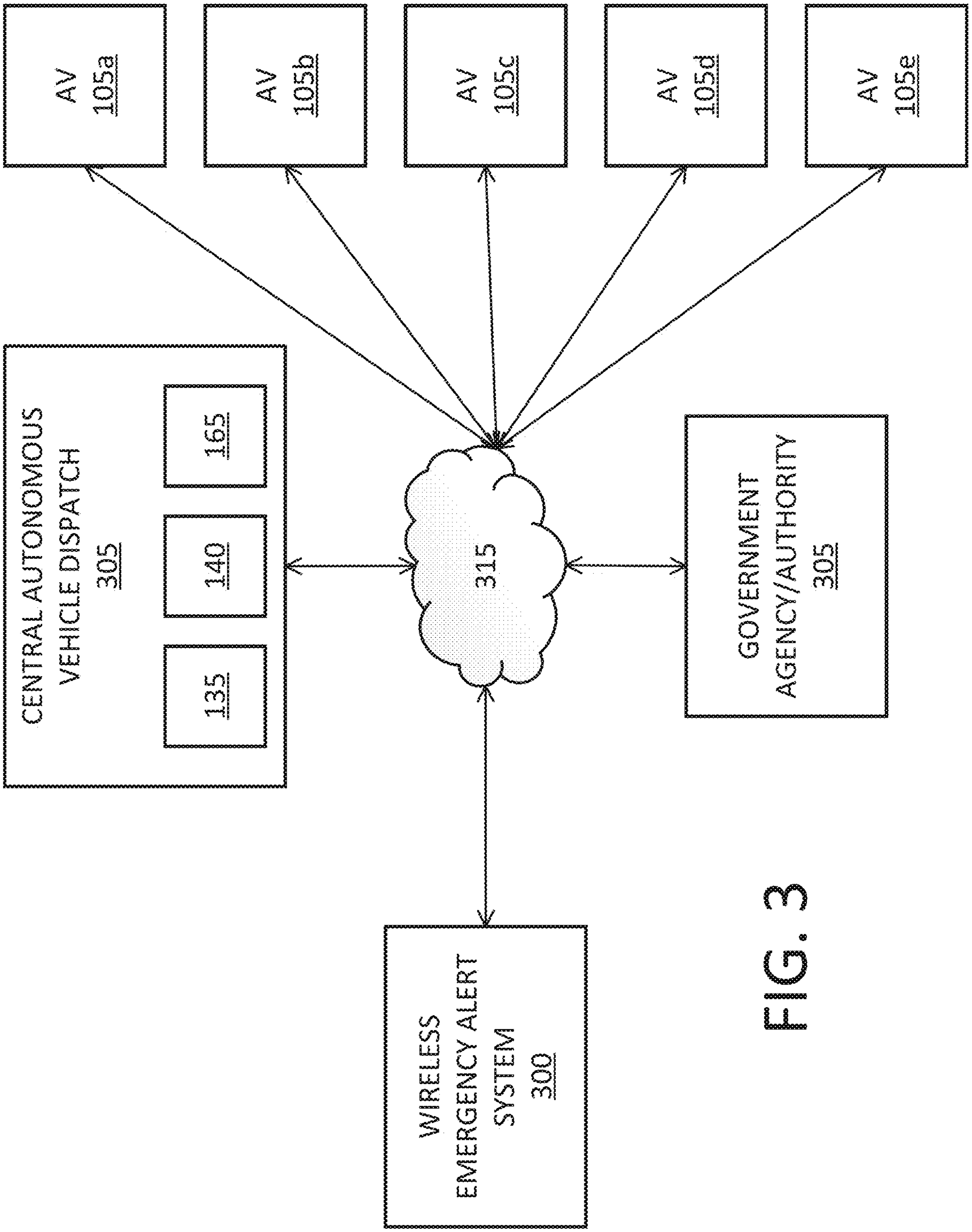
FIG. 3 is an example block diagram of a wireless emergency alert system, according to various embodiments of the present disclosure.

The emergency alert may be generated and sent via a wireless emergency alert system 300 as shown, e.g., in FIG. 3.

The wireless emergency alert system 300 may be configured to receive and/or generate an emergency alert, and may be configured to send the emergency alert, via, e.g., a central dispatch 305, to one or more appropriate autonomous vehicles (e.g., AVs 105*a*, 105*b*, 105*c*, 105*d*, and 105*e*). The central dispatch 305 and the one or more appropriate autonomous vehicles (e.g., AVs 105*a*, 105*b*, 105*c*, 105*d*, and 105*e*) may be configured to communicate with each other, enabling a transfer of information to and from the central dispatch 305 and the one or more appropriate autonomous vehicles (e.g., AVs 105*a*, 105*b*, 105*c*, 105*d*, and 105*e*).

According to various embodiments, the wireless emergency alert system 300 may be configured to determine the appropriate autonomous vehicles based on a geographic location/region of each vehicle as compared to the geographic location/region designated by the emergency alert, thereby only relaying the emergency alert to vehicles that are located within the geographic location/region designated by the emergency alert.

According to various embodiments, upon receiving the emergency alert, a state of an autonomous vehicle's emergency alert module 205 is set to an on state, enabling the autonomous vehicle to analyze one or more vehicles within the surrounding environment of the vehicle in order to determine if the wanted vehicle is within the surrounding environment of the autonomous vehicle.

According to various embodiments, when a vehicle (e.g., AVs 105*a*, 105*b*, 105*c*, 105*d*, and/or 105*e*) makes a positive identification for a wanted vehicle, the identification can be sent, from the vehicle, back to the central dispatch 305 to send a response to one or more appropriate agencies and/or authorities 310 that are responsive to the emergency alert. The wireless emergency alert system 300 may be configured to generate and/or send (via, e.g., the central dispatch 305) one or more inactive commands to all vehicles (e.g., AVs 105*a*, 105*b*, 105*c*, 105*d*, and/or 105*e*) that were otherwise active in the search. According to various embodiments, once an autonomous vehicle receives an inactive command, the state of the autonomous vehicle's emergency alert module 205 is set to an off state.

According to various embodiments, once a positive identification of the wanted vehicle is made, the wireless emergency alert system 300 may be configured to generate and/or send (via, e.g., the central dispatch 305), a command to remain active to any vehicles within a geographic region of the positively identified vehicle until receiving a subsequent inactive command.

According to various embodiments, the central dispatch 305 may comprise one or more processors 135, memory 140, transceivers 165, user interfaces, displays, and/or other suitable components. The transceiver 165 may be configured to receive a positive identification signal generated from an autonomous vehicle, the positive identification signal indicating that a wanted vehicle has been positively identified. The memory 140 may be configured to store programming instructions that, when executed by the processor 135, cause the processor 135 to identify a location of the autonomous vehicle, locate one or more other autonomous vehicles that are searching for the wanted vehicle, subject to an emergency alert, and generate, using the processor 135, and/or send, by the transceiver 165, a search halt command to some or all of the one or more other autonomous vehicles searching for the wanted vehicle, the search halt command configured to cause the one or more other autonomous vehicle to cease a search for the wanted vehicle.

According to various embodiments, the transceiver 165 may be further configured to receive velocity information regarding the wanted vehicle. The programming instructions, when executed, may be further configured to cause the processor 135 to determine which of the one or more other autonomous vehicles are less than a threshold distance from the autonomous vehicle that generated the positive identification signal, and, based on the velocity information, generate, using the processor 135, and/or send, using the transceiver 165, a command to stay active in the search for the wanted vehicle to the one or more other autonomous vehicles that are less than a threshold distance from the autonomous vehicle that generated the positive identification signal.

The programming instructions, when executed, may be further configured to cause the processor 135 to generate, using the processor 135, and/or send, using the transceiver 165, a command to stay active in the search for the wanted vehicle to the autonomous vehicle that sent the positive identification signal until the wanted vehicle is no longer within a field of vision of the autonomous vehicle that sent the positive identification signal.

According to various embodiments, the wireless emergency alert system 300, the central autonomous vehicle dispatch 305, the one or more appropriate agencies and/or authorities 310, and/or the autonomous vehicles (e.g., AVs 105*a*, 105*b*, 105*c*, 105*d*, and/or 105*e*) are in electronic communication with each other via one or more wire and/or wireless connection such as, e.g., the cloud 315. According to various embodiments, multiple vehicles may (e.g., AVs 105*a*, 105*b*, 105*c*, 105*d*, and/or 105*e*) may be in communication with each other.

Figure 4:
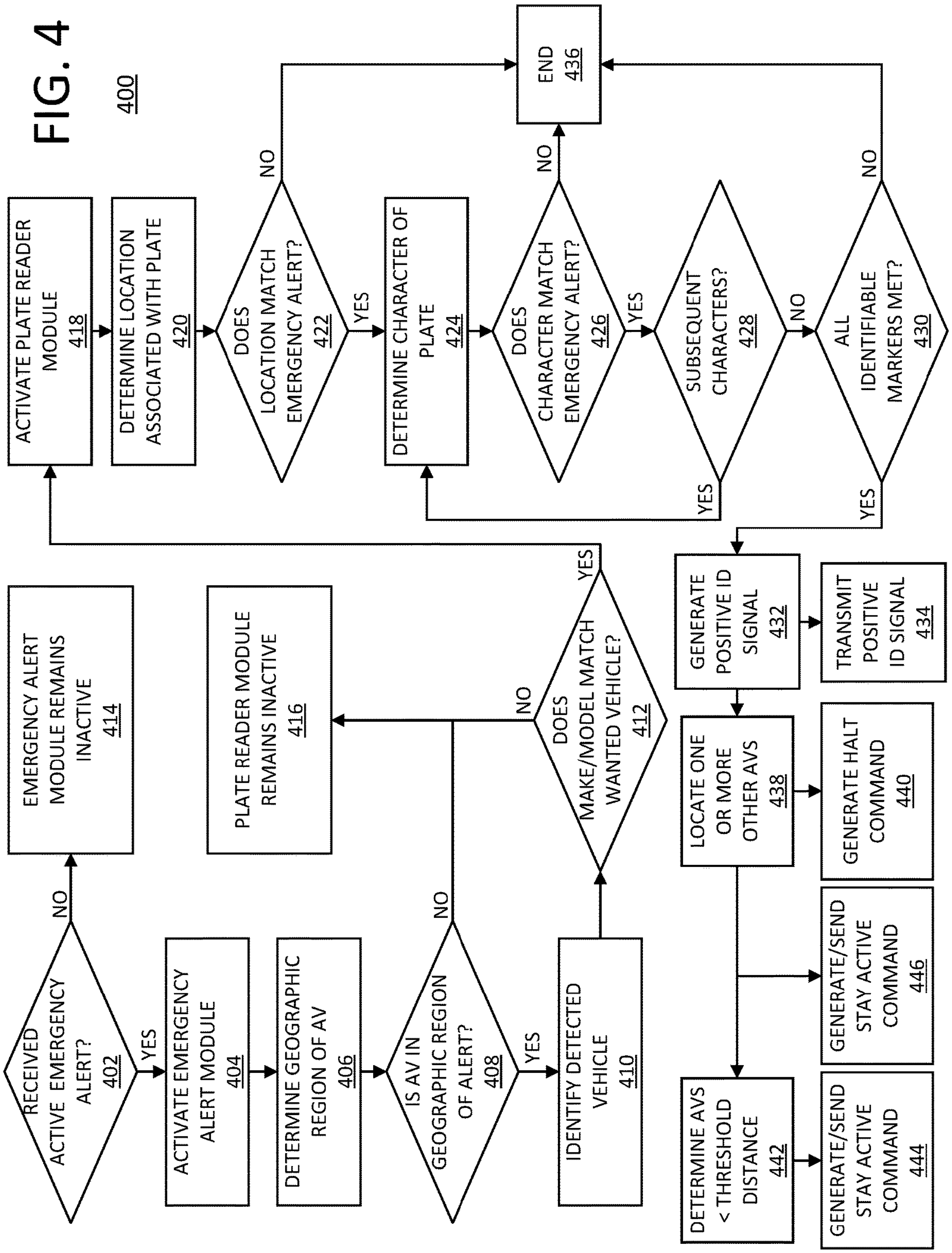
FIG. 4 is an example flowchart of a method for identifying a vehicle subject to an emergency alert, according to various embodiments of the present disclosure.

Referring now to FIG. 4, an example flowchart of a method 400 for identifying a vehicle subject to an emergency alert is described, in accordance with various embodiments of the present disclosure.

According to various embodiments, an emergency alert module of an autonomous vehicle may remain inactive until an active emergency alert has been received. The emergency alert may include a geographic region associated with the emergency alert and one or more identifiable markers of a wanted vehicle. According to various embodiments, the one or more identifiable markers may include one or more of one or more license plate characters of the wanted vehicle, a location associated with a license plate of the wanted vehicle, a make of the wanted vehicle, a model of the wanted vehicle, a color of the wanted vehicle, and/or other suitable identifiable markers.

At 402, it is determined whether an active emergency alert has been received. If no active emergency alert has been received, at 414, the emergency alert module remains inactive. If an active emergency alert has been received, then, at 404, the emergency alert module of the autonomous vehicle is activated and, at 406, a geographic region of the autonomous vehicle is determined. According to various embodiments, the geographic region of the autonomous vehicle is determined using one or more location detection systems coupled to the autonomous vehicle.

At 408, it is determined whether the geographic region of the autonomous vehicle is within the geographic region associated with the emergency alert. For example, if the geographic region of the autonomous vehicle is not within the geographic region associated with the emergency alert then, at 416, the plate reader module may remain inactive. In another example, if the geographic region of the autonomous vehicle is within the geographic region associated with the emergency alert then, at 410, a vehicle (a detected vehicle) may be detected and identified, within an environment of the autonomous vehicle, using one or more detection mechanisms of the autonomous vehicle. According to various embodiments, when the autonomous vehicle is within the geographic region associated with the emergency alert, for each identifiable marker, is it determined whether the detected vehicle matches the identifiable marker.

At 412, it is determined whether the make and/or model of the detected vehicle matches the make and/or model of the wanted vehicle in the emergency alert. For example, if the make and/or model of the detected vehicle does not match the make and/or model of the wanted vehicle in the emergency alert then, at 416, the plate reader module may remain inactive. If the make and/or model of the detected vehicle matches the make and/or model of the wanted vehicle in the emergency alert then, at 418, the plate reader module may be activated which detects and identifies the license plate on the detected vehicle and, at 420, a location associated with the license plate of the detected vehicle may be determined. The location associated with the license plate of the detected vehicle may be, e.g., a state or territory in which the detected vehicle is registered/licensed.

At 422, it is determined whether the location of the license plate of the detected vehicle matches the location associated with the wanted vehicle in the emergency alert. When the location associated with the license plate of the detected vehicle does not match the location associated with the license plate of the wanted vehicle in the emergency alert then, at 436, the analysis of the detected vehicle ends. When the location associated with the license plate of the detected vehicle matches the location associated with the license plate of the wanted vehicle in the emergency alert then, at 424, the license plate of the detected vehicle is analyzed and a character of the license plate of the detected vehicle is identified and determined.

At 426, it is determined whether the character of the license plate of the detected vehicle matches respective corresponding character of the wanted vehicle in the emergency alert. If the character of the license plate of the detected vehicle does not match the respective corresponding character of the license plate of the wanted vehicle in the emergency alert then, at 436, the analysis of the detected vehicle ends. If the character of the license plate of the detected vehicle matches the respective corresponding character of the license plate of the wanted vehicle in the emergency alert then, at 428, it is determined whether there are any subsequent characters remaining on the license plate of the detected vehicle. If there are subsequent characters remaining on the license plate of the detected vehicle then, for each subsequent character, steps 424, 426, and 428 are repeated. This process enables the license plate of the detected vehicle to be analyzed one character at a time, preventing the entire license plate of the detected vehicle to be analyzed if any one character of the license plate of the detected vehicle does not match the respective corresponding character of the license plate of the wanted vehicle in the emergency alert.

If there are no subsequent characters of the license plate of the detected vehicle then, at 430, it is determined whether the identifiable markers of the wanted vehicle have been met by the detected vehicle. According to various embodiments, if the identifiable markers have not been met by the detected vehicle then, at 436, the analysis of the detected vehicle ends. If the identifiable markers have been met by the detected vehicle then, at 432, the autonomous vehicle generates a positive identification signal, identifying the detected vehicle as the wanted vehicle of the emergency alert and, at 434, the positive identification signal is transmitted to one or more appropriate recipients. The positive identification signal may include information related to the location of the wanted vehicle, as well as information related to the speed of the wanted vehicle. Additionally, if one or more of the sensors have captured any information related to the occupants of the vehicle (e.g., whether a suspect and/or victim appear to be in the wanted vehicle, any identifying characteristics of the occupants, such as, e.g., clothing, and/or other suitable information related to the occupants of the vehicle), then such information may also be transmitted to the authorities as part of the positive identification signal. According to various embodiments, when a positive identification has been made, a central dispatch, comprising one or more processors, memory, transceivers, user interfaces, displays, and/or other suitable components. The transceiver may be configured to receive the positive identification signal generated from an autonomous vehicle. The memory may be configured to store programming instructions that, when executed by the processor, cause the processor, at 438, to locate one or more other autonomous vehicles that are searching for the wanted vehicle, subject to the emergency alert, and, at 440, generate, using the processor, and/or send, by the transceiver, a search halt command to some or all of the one or more other autonomous vehicles searching for the wanted vehicle, the search halt command configured to cause the one or more other autonomous vehicle to cease a search for the wanted vehicle. According to various embodiments, the transceiver may be further configured to receive velocity information regarding the wanted vehicle. The programming instructions, when executed, may be further configured to cause the processor, at 442, to determine which of the one or more other autonomous vehicles are less than a threshold distance from the autonomous vehicle that generated the positive identification signal, and, at 444, based on the velocity information, generate, using the processor, and/or send, using the transceiver, a command to stay active in the search for the wanted vehicle to the one or more other autonomous vehicles that are less than a threshold distance from the autonomous vehicle that generated the positive identification signal. According to various embodiments, the programming instructions, when executed, may be further configured to cause the processor, at 446, to generate, using the processor, and/or send, using the transceiver, a command to stay active in the search for the wanted vehicle to the autonomous vehicle that sent the positive identification signal until the wanted vehicle is no longer within a field of vision of the autonomous vehicle that sent the positive identification signal.

Figure 5:
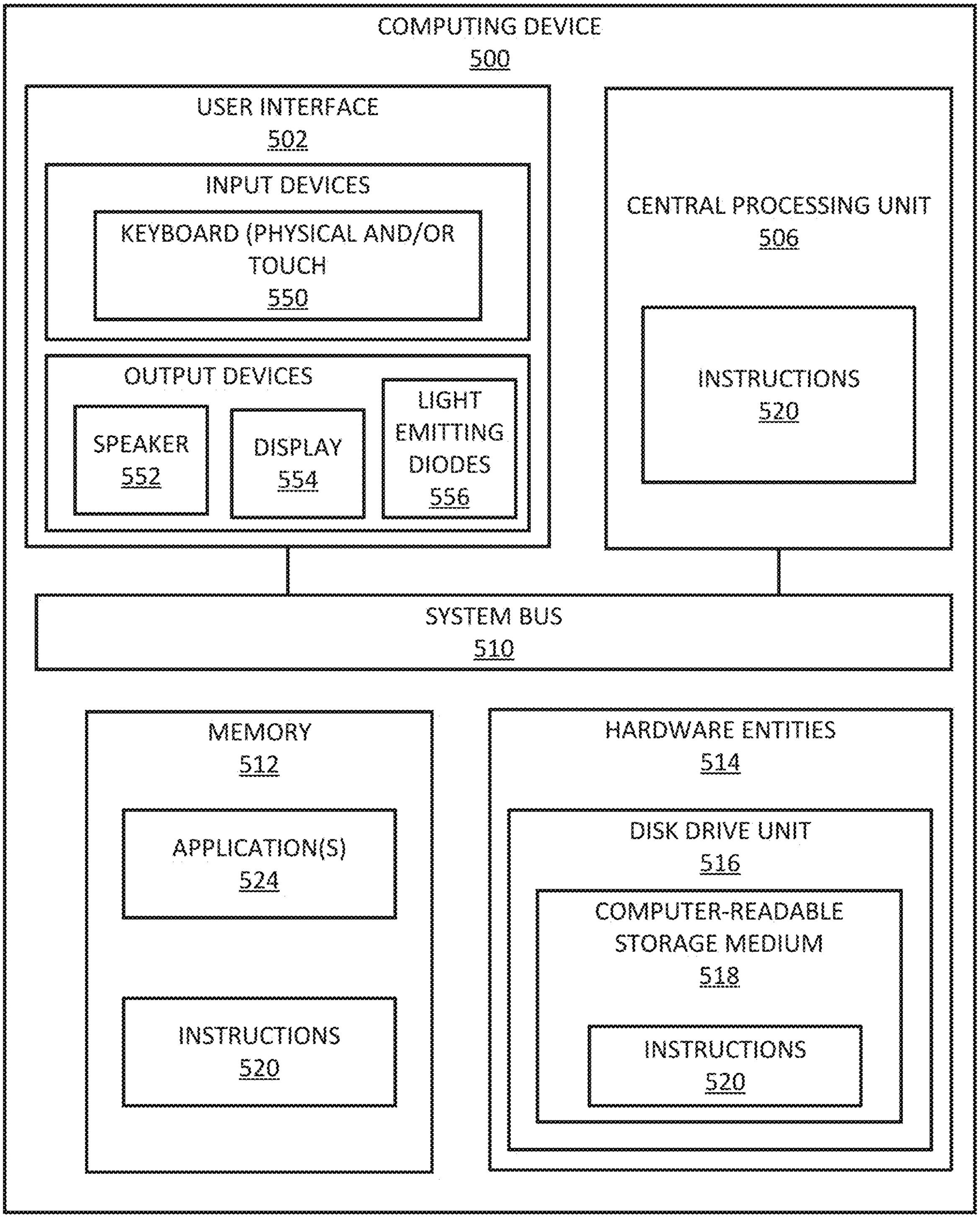
FIG. 5 illustrates example elements of a computing device, according to various embodiments of the present disclosure.

Referring now to FIG. 5, an illustration of an example architecture for a computing device 500 is provided. The computing device 130 of FIG. 1 may be the same as or similar to computing device 500. As such, the discussion of computing device 500 is sufficient for understanding the computing device 130 of FIG. 1, for example.

Computing device 500 may include more or less components than those shown in FIG. 1. The hardware architecture of FIG. 5 represents one example implementation of a representative computing device configured to one or more methods and means for identifying a vehicle subject to an emergency alert, as described herein. As such, the computing device 500 of FIG. 5 implements at least a portion of the method(s) described herein (for example, method 400 of FIG. 4).

Some or all components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, and hardware entities 514 connected to system bus 510. The user interface can include input devices and output devices, which facilitate user-software interactions for controlling operations of the computing device 500. The input devices may include, but are not limited to, a physical and/or touch keyboard 550. The input devices can be connected to the computing device 500 via a wired or wireless connection (e.g., a Bluetooth® connection). The output devices may include, but are not limited to, a speaker 552, a display 554, and/or light emitting diodes 556.

At least some of the hardware entities 514 perform actions involving access to and use of memory 512, which can be a Random Access Memory (RAM), a disk driver and/or a Compact Disc Read Only Memory (CD-ROM), among other suitable memory types. Hardware entities 514 can include a disk drive unit 516 comprising a computer-readable storage medium 518 on which is stored one or more sets of instructions 520 (e.g., programming instructions such as, but not limited to, software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media", as used here, may refer to a single medium or multiple media (e.g., a centralized or distributed database, and/or associated caches and servers) that store the one or more sets of instructions 520. The term "machine-readable media", as used here, also may refer to any medium that is capable of storing, encoding or carrying a set of instructions 520 for execution by the computing device 500 and that cause the computing device 500 to perform any one or more of the methodologies of the present disclosure.

Figure 6:
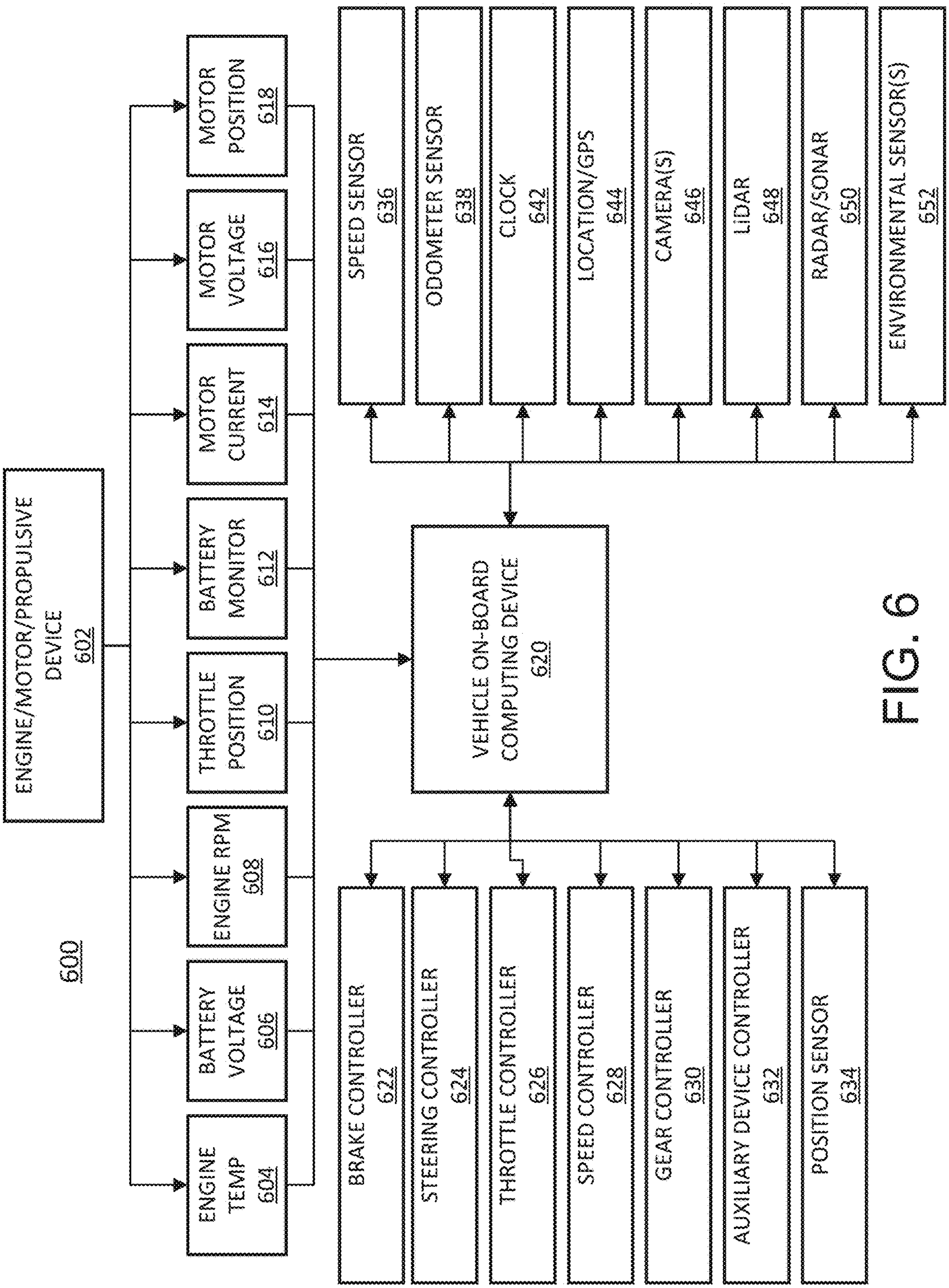
FIG. 6 illustrates example architecture of a vehicle, according to various embodiments of the present disclosure.

Referring now to FIG. 6, example vehicle system architecture 600 for a vehicle is provided, in accordance with various embodiments of the present disclosure.

Vehicle 105 of FIG. 1 can have the same or similar system architecture as that shown in FIG. 6. Thus, the following discussion of vehicle system architecture 600 is sufficient for understanding vehicle 105 FIG. 1.

As shown in FIG. 6, the vehicle system architecture 600 includes an engine, motor or propulsive device (e.g., a thruster) 602 and various sensors 604-618 for measuring various parameters of the vehicle system architecture 600. In gas-powered or hybrid vehicles having a fuel-powered engine, the sensors 604-618 may include, for example, an engine temperature sensor 604, a battery voltage sensor 606, an engine Rotations Per Minute (RPM) sensor 608, and/or a throttle position sensor 610. If the vehicle is an electric or hybrid vehicle, then the vehicle may have an electric motor, and accordingly will have sensors such as a battery monitoring system 612 (to measure current, voltage and/or temperature of the battery), motor current 614 and voltage 616 sensors, and motor position sensors such as resolvers and encoders 618.

Operational parameter sensors that are common to both types of vehicles may include, for example: a position sensor 634 such as an accelerometer, gyroscope and/or inertial measurement unit; a speed sensor 636; and/or an odometer sensor 638. The vehicle system architecture 600 also may have a clock 642 that the system uses to determine vehicle time during operation. The clock 642 may be encoded into the vehicle on-board computing device 620, it may be a separate device, or multiple clocks may be available.

The vehicle system architecture 600 also may include various sensors that operate to gather information about the environment in which the vehicle is traveling. These sensors may include, for example: a location sensor 644 (for example, a Global Positioning System (GPS) device), such as, e.g., location detection system 145 in FIG. 1; object detection sensors such as one or more cameras 646; a LiDAR sensor system 648; and/or a radar and/or a sonar system 650. The sensors also may include environmental sensors 652 such as a precipitation sensor and/or ambient temperature sensor. The object detection sensors may enable the vehicle system architecture 600 to detect objects that are within a given distance range of the vehicle 600 in any direction, while the environmental sensors 652 collect data about environmental conditions within the vehicle's area of travel.

During operations, information is communicated from the sensors to an on-board computing device 620. The on-board computing device 620 may be configured to analyze the data captured by the sensors and/or data received from data providers, and may be configured to optionally control operations of the vehicle system architecture 600 based on results of the analysis. For example, the on-board computing device 620 may be configured to control: braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers.

Geographic location information may be communicated from the location sensor 644 to the on-board computing device 620, which may then access a map of the environment that corresponds to the location information to determine known fixed features of the environment such as streets, buildings, stop signs and/or stop/go signals. Captured images from the cameras 646 and/or object detection information captured from sensors such as LiDAR 648 is communicated from those sensors to the on-board computing device 620. The object detection information and/or captured images are processed by the on-board computing device 620 to detect objects in proximity to the vehicle. Any known or to be known technique for making an object detection based on sensor data and/or captured images may be used in the embodiments disclosed in this document.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system for identifying a vehicle subject to an emergency alert, comprising:

one or more autonomous vehicles, each autonomous vehicle comprising a vehicle detection and identification system configured to analyze one or more vehicles within a surrounding environment; and a wireless emergency alert system configured to:

receive or generate an emergency alert, wherein the emergency alert includes a geographic region associated with the emergency alert and one or more identifiable markers of a wanted vehicle;

determine one or more autonomous vehicles to receive the emergency alert; and relay the emergency alert to the one or more autonomous vehicles, wherein:

the analyzing the one or more vehicles within the surrounding environment comprises:

detecting a license plate of a detected vehicle, of the one or more vehicles;

determining, using a license plate reader module of the one or more autonomous vehicles, a location associated with the license plate of the detected vehicle; and when the location associated with the license plate of the detected vehicle matches a location associated with the license plate of the wanted vehicle, analyzing, using the license plate reader module, the license plate of the detected vehicle, the vehicle detection and identification system is configured to determine whether a vehicle within the surrounding environment matches the one or more identifiable markers of the wanted vehicle, when the vehicle within the surrounding environment matches the one or more identifiable markers, the vehicle detection and identification system is further configured to:

generate a positive identification signal indicating that the vehicle matches the wanted vehicle and that the vehicle is a positively identified vehicle, and receive velocity information regarding the wanted vehicle, and the wireless emergency alert system is further configured to:

determine which of one or more other autonomous vehicles are less than a threshold distance from an autonomous vehicle that generated the positive identification signal; and based on the velocity information, send a command to stay active in a search for the wanted vehicle to the one or more other autonomous vehicles that are less than a threshold distance from the autonomous vehicle that generated the positive identification signal.

2. The system of claim 1, further comprising a central dispatch, and wherein the wireless emergency alert system is configured to relay the emergency alert to the one or more autonomous vehicles via the central dispatch.

3. The system of claim 1, wherein determining the one or more autonomous vehicles to receive the emergency alert comprises:

determining which autonomous vehicles are located within the geographic region; and selecting one or more autonomous vehicles within the geographic region as the one or more autonomous vehicles to receive the emergency alert.

4. The system of claim 1, wherein the vehicle detection and identification system comprises:

one or more detection mechanisms configured to capture one or more images of the surrounding environment;

one or more location detection systems; and an emergency alert module configured to analyze the one or more images of the surrounding environment.

5. The system of claim 4, wherein the emergency alert module comprises one or more of the following:

a color detection module, configured to detect one or more colors of the detected vehicle within the one or more images;

a make/model detection module, configured to detect a make or model of the detected vehicle; and the license plate reader module, configured to detect:

the location associated with a license plate of the detected vehicle; and one or more characters of the license plate.

6. The system of claim 4, wherein, for each autonomous vehicle:

upon receiving the emergency alert, the autonomous vehicle is configured to set a state of the emergency alert module to an on state.

7. The system of claim 4, wherein the wireless emergency alert system is further configured to:

generate a command to stay active configured to set a state of the emergency alert module of any of the one or more autonomous vehicles within a geographic region of the positively identified vehicle to be in an on state; and send the command to stay active to the one or more autonomous vehicles within the geographic region of the positively identified vehicle.

8. A system for identifying a vehicle subject to an emergency alert, comprising:

one or more autonomous vehicles, each autonomous vehicle comprising a vehicle detection and identification system configured to analyze one or more vehicles within a surrounding environment;

a central dispatch; and a wireless emergency alert system configured to:

receive or generate an emergency alert;

determine one or more autonomous vehicles to receive the emergency alert; and relay the emergency alert to the one or more autonomous vehicles via the central dispatch, wherein:

the emergency alert comprises a geographic region associated with the emergency alert and one or more identifiable markers of a wanted vehicle, and the wireless emergency alert system comprises an emergency alert module configured to analyze the one or more images of the surrounding environment, wherein:

the analyzing the one or more vehicles within the surrounding environment comprises:

detecting a license plate of a detected vehicle, of the one or more vehicles;

determining, using a license plate reader module of the one or more autonomous vehicles, a location associated with the license plate of the detected vehicle; and when the location associated with the license plate of the detected vehicle matches a location associated with the license plate of the wanted vehicle, analyzing, using the license plate reader module, the license plate of the detected vehicle, the vehicle detection and identification system is configured to determine whether a vehicle within the surrounding environment matches the one or more identifiable markers of the wanted vehicle, when the vehicle within the surrounding environment matches the one or more identifiable markers, the vehicle detection and identification system is further configured to:

generate a positive identification signal indicating that the vehicle matches the wanted vehicle and that the vehicle is a positively identified vehicle, and receive velocity information regarding the wanted vehicle, and the central dispatch is configured to:

determine which of one or more other autonomous vehicles are less than a threshold distance from an autonomous vehicle that generated the positive identification signal; and based on the velocity information, send a command to stay active in a search for the wanted vehicle to the one or more other autonomous vehicles that are less than a threshold distance from the autonomous vehicle that generated the positive identification signal.

9. The system of claim 8, wherein:

the emergency alert is designated for a geographic region, and determining the one or more autonomous vehicles to receive the emergency alert comprises:

determining which autonomous vehicles are located within the geographic region; and selecting one or more autonomous vehicles within the geographic region as the one or more autonomous vehicles to receive the emergency alert.

10. The system of claim 8, wherein the vehicle detection and identification system further comprises:

one or more detection mechanisms configured to capture one or more images of the surrounding environment; and one or more location detection systems, wherein the emergency alert module is further configured to analyze the one or more images of the surrounding environment.

11. The system of claim 10, wherein the emergency alert module comprises one or more of the following:

a color detection module, configured to detect one or more colors of the detected vehicle within the one or more images;

a make/model detection module, configured to detect a make or model of the detected vehicle; and a plate reader module, configured to detect:

a location associated with a license plate of the detected vehicle; and one or more characters of the license plate.

12. The system of claim 10, wherein, for each autonomous vehicle:

upon receiving the emergency alert, the autonomous vehicle is configured to set a state of the emergency alert module to an on state.

13. The system of claim 10, wherein the wireless emergency alert system is further configured to:

generate a command to stay active configured to set a state of the emergency alert module of any of the one or more autonomous vehicles within a geographic region of the positively identified vehicle to be in an on state; and send the command to stay active to the one or more autonomous vehicles within the geographic region of the positively identified vehicle.

14. A central dispatch for identifying a vehicle subject to an emergency alert, comprising:

a transceiver configured to:

receive a positive identification signal generated from an autonomous vehicle, the positive identification signal indicating that a wanted vehicle has been positively identified; and receive velocity information regarding the wanted vehicle;

a processor; and a memory configured to store programming instructions that, when executed, cause the processor to:

identify a location of the autonomous vehicle;

locate one or more other autonomous vehicles that are searching for the wanted vehicle, subject to an emergency alert;

send, by the transceiver, a search halt command to some or all of the one or more other autonomous vehicles searching for the wanted vehicle, the search halt command configured to cause the one or more other autonomous vehicle to cease a search for the wanted vehicle;

determine which of the one or more other autonomous vehicles are less than a threshold distance from the autonomous vehicle that generated the positive identification signal; and based on the velocity information, send, using the transceiver, a command to stay active in the search for the wanted vehicle to the one or more other autonomous vehicles that are less than a threshold distance from the autonomous vehicle that generated the positive identification signal.

15. The central dispatch of claim 14, wherein the programming instructions, when executed, are further configured to cause the processor to send a command to stay active in the search for the wanted vehicle to the autonomous vehicle that sent the positive identification signal until the wanted vehicle is no longer within a field of vision of the autonomous vehicle that sent the positive identification signal.

* * * * *